United States Patent
Tost et al.

(10) Patent No.: US 9,424,100 B2
(45) Date of Patent: Aug. 23, 2016

(54) MONITORING AND VALIDATING THE COORDINATED EXECUTION OF SEQUENCED TASKS BY AN ELECTRONIC CARD WITH TWO PROCESSORS SYNCHRONIZED TO DIFFERENT CLOCKS

(71) Applicant: Airbus Operations SAS, Toulouse (FR)

(72) Inventors: Gilles Tost, Tournefeuille (FR); David Roblero Martinez, Toulouse (FR); Thierry Dejean, Villefranche de Lauragais (FR); Sophie Deneuville, Mondonville (FR); Laurent Marliere, Fontenilles (FR); Hél ène Blouin, Fronton (FR)

(73) Assignee: Airbus Operations SAS (FR)

( * ) Notice: Subject to any disclaimer, the term of this patent is extended or adjusted under 35 U.S.C. 154(b) by 421 days.

(21) Appl. No.: 13/949,868

(22) Filed: Jul. 24, 2013

(65) Prior Publication Data

US 2014/0033225 A1    Jan. 30, 2014

(30) Foreign Application Priority Data

Jul. 30, 2012   (FR) ..................................... 12 57381

(51) Int. Cl.

| | |
|---|---|
| *G06F 9/52* | (2006.01) |
| *G06F 11/07* | (2006.01) |
| *H04W 56/00* | (2009.01) |
| *G06F 1/12* | (2006.01) |

(52) U.S. Cl.
CPC ............. *G06F 9/52* (2013.01); *G06F 11/0715* (2013.01); *G06F 11/0724* (2013.01); *G06F 11/0739* (2013.01); *G06F 11/0763* (2013.01); *G06F 1/12* (2013.01); *H04W 56/00* (2013.01)

(58) Field of Classification Search
None
See application file for complete search history.

(56) References Cited

U.S. PATENT DOCUMENTS

| | | | |
|---|---|---|---|
| 4,712,213 A | 12/1987 | Warwick et al. | |
| 5,450,573 A | 9/1995 | Gronemeyer | |
| 5,724,527 A | 3/1998 | Karnik et al. | |
| 6,351,821 B1* | 2/2002 | Voth ..................... | H04J 3/0667 709/248 |

(Continued)

FOREIGN PATENT DOCUMENTS

| | | |
|---|---|---|
| EP | 1990733 A1 | 11/2008 |
| WO | 92/03785 A1 | 3/1992 |

OTHER PUBLICATIONS

U.S. Appl. No. 13/949,826, filed Jul. 24, 2013.

*Primary Examiner* — Benjamin Wu
(74) *Attorney, Agent, or Firm* — Lerner, David, Littenberg, Krumholz & Mentlik, LLP

(57) ABSTRACT

A method for monitoring the coordinated execution of sequenced tasks by an electronic device including a main electronic card including at least one main processor synchronized to a main clock and at least one auxiliary electronic card including at least one auxiliary processor synchronized to an auxiliary clock, includes

- emitting by the main processor of a coordination marker to the auxiliary processor at the start of each main time period;
- emitting by the auxiliary processor of a response word formed on the basis of the last coordination marker received to the main processor at the end of each auxiliary time period;
- validating by the main processor of the response word received with respect to the first coordination marker emitted; and
- signaling by the main processor if the response word received is not valid so as to signal a defect of coordination of the auxiliary processor.

8 Claims, 6 Drawing Sheets

(56) References Cited

U.S. PATENT DOCUMENTS

| | | | | |
|---|---|---|---|---|
| 6,714,611 B1* | 3/2004 | Du | H04W 56/0035 | 375/356 |
| 7,043,651 B2* | 5/2006 | Aweya | H03L 7/093 | 375/356 |
| 7,065,779 B1* | 6/2006 | Crocker | H04N 21/242 | 725/111 |
| 7,085,276 B1* | 8/2006 | Heitmann | G06F 1/14 | 370/395.4 |
| 7,356,617 B2* | 4/2008 | Suzuki | H04J 3/0664 | 375/356 |
| 7,990,909 B2* | 8/2011 | Brueckheimer | H04J 3/0667 | 370/324 |
| 8,571,005 B1* | 10/2013 | Vleugels | G06F 5/16 | 370/350 |
| 8,806,138 B1 | 8/2014 | Colby | | |
| 2003/0152110 A1* | 8/2003 | Rune | H04J 3/0682 | 370/509 |
| 2004/0008973 A1* | 1/2004 | Marshall | G06F 1/12 | 386/202 |
| 2004/0133390 A1* | 7/2004 | Osorio | A61B 5/0006 | 702/178 |
| 2005/0120258 A1* | 6/2005 | Sohda | G06F 1/12 | 713/400 |
| 2008/0294926 A1* | 11/2008 | Eshraghian | H04J 3/0685 | 713/400 |
| 2009/0055685 A1 | 2/2009 | Mochida et al. | | |
| 2010/0202436 A1* | 8/2010 | Albert | H04J 3/0655 | 370/350 |
| 2010/0290572 A1* | 11/2010 | Garner | H04J 3/0682 | 375/356 |
| 2012/0219099 A1* | 8/2012 | Loukianov | G06F 1/14 | 375/357 |
| 2013/0010814 A1* | 1/2013 | Miyabe | H04J 3/0652 | 370/503 |
| 2013/0070751 A1* | 3/2013 | Atwal | H04W 56/001 | 370/350 |
| 2014/0033225 A1* | 1/2014 | Tost | G06F 11/0739 | 718/106 |

\* cited by examiner

MONITORING AND VALIDATING THE COORDINATED EXECUTION OF SEQUENCED TASKS BY AN ELECTRONIC CARD WITH TWO PROCESSORS SYNCHRONIZED TO DIFFERENT CLOCKS

TECHNICAL FIELD

The present invention relates to the general field of electronic systems comprising several processors for executing functional tasks. The invention applies more particularly to an electronic system taking the form of an electronic computer onboard an aircraft.

In a conventional manner, with reference to FIG. 1, a flight computer comprises a main printed circuit card CP and two auxiliary printed circuit cards CA1, CA2. In a traditional manner, each main card CP and auxiliary card CA1, CA2 comprises a processor PP1, PA1, PA2 adapted for carrying out functional tasks defined in a program PROG communicated to the main card CP and interpreted by the processor PP1 of the main card CR The processors PP1, PA1, PA2 of the various cards CP, CA1, CA2 are linked by communication links L1, L2, for example, communication buses. By way of example, each auxiliary card CA1, CA2 comprises an auxiliary processor PA1, PA2 one of the functions of which consists in managing the input and output data of the computer. Hereinafter, the input/output data are designated I/O data. For example, the auxiliary processor PA1, PA2 of the auxiliary card CA1, CA2 reads data arising from the aircraft and dispatches orders to devices of the aircraft. The reading of data and the emission of orders are examples of functional tasks carried out by the auxiliary processor PA1, PA2 of the auxiliary card CA1, CA2.

Stated otherwise, the main processor PP1 of the main card CP interprets the functional tasks of the program and communicates some of them, via the communication links L1, L2, to the auxiliary processors PA1, PA2 of the auxiliary cards CA1, CA2 so that these latter carry out a reading of data or issue an order.

In a conventional manner, the functional tasks of the program PROG are sequenced and must be carried out in a determined order. To allow ordered execution of the tasks of the program PROG, the main card CP possesses a clock which makes it possible to synchronize the execution of the tasks. Instructions of the functional tasks are thereafter communicated to an auxiliary processor PA1, PA2 of one of the auxiliary cards.

To ensure the reliability of the computer, it is necessary to have means for checking the coordination of the execution of the tasks of the main processor PP1 with those of the auxiliary processors PA1, PA2. In practice, the clock of the auxiliary processors PA1, PA2 is substantially faster than that of the main processor PP1, given that the auxiliary cards CA1, CA2 must be highly reactive to monitor the inputs/outputs. Stated otherwise, the main processor PP1 and the auxiliary processor PA1 are asynchronous.

To allow the coordination of asynchronous processors, the prior art discloses a DMA (for "Direct Memory Access") method between a main processor PP1 and an auxiliary processor PA1, PA2 which makes it possible to verify that the two processors PP1, PA1 or PP1, PA2 communicate in a coordinated manner.

This DMA link allows reciprocal monitoring of the asynchronous processors but remains complex to implement since it must, on the one hand, ensure that the main processor PP1 is healthy and on the other hand, that the auxiliary processor PA1 or PA2 is healthy. Such synchronization means are difficult to implement and are no longer appropriate to current specifications, thereby constituting a first drawback.

Furthermore, having regard to the number of functional tasks to be executed by the main card CP of the computer, it has been proposed to resort to a main card CP comprising two main processors PP1, PP2 which are linked together by a main communication link LP in such a way that the functional tasks are executed in a distributed manner between the two main processors PP1 and PP2 while making it possible to carry out several tasks in parallel. Furthermore, each main processor PP1, PP2 is linked to the auxiliary processors PA1, PA2 by an auxiliary communication link L11, L12, L21, L22 as illustrated in FIG. 2.

Thus, for a program PROG comprising sequenced functional tasks S1, S2 and S3, the tasks S1 and S3 can be carried out by the first main processor PP1 while the task S2 is carried out by the second main processor PP2. It follows that it is necessary to synchronize the operation of the two main processors PP1, PP2 so as to detect in an immediate manner a possible malfunction of one of the main processors PP1, PP2 or of the main communication link LP.

Indeed, in the absence of synchronization, the malfunction can only be observed late by a coherence checking device, thereby exhibiting a drawback. Furthermore, to coordinate the two main processors PP1, PP2, a DMA link according to the prior art cannot be implemented since it is adapted only for asynchronous operations.

An immediate solution for carrying out the coordination would consist in having a main processor PP1 control the second main processor PP2 according to the "master-slave" principle. Nonetheless, the reliability of such a solution is not satisfactory, given that a malfunction of the "master" processor would give rise directly to a malfunction of the "slave" processor. Hence, there exists a need to ensure the coordination of the tasks executed by an onboard system comprising a plurality of processors so as to monitor in a reliable manner and be able to toggle to an onboard backup system in a reactive manner in case of malfunction.

SUMMARY OF THE INVENTION

For this purpose, an aspect of the invention relates to a method for monitoring the coordinated execution of sequenced tasks by an electronic device comprising a main electronic card comprising at least one main processor synchronized to a main clock of main time period and at least one auxiliary electronic card comprising at least one auxiliary processor synchronized to an auxiliary clock of auxiliary time period, the auxiliary clock being faster than the main clock, the sequenced tasks having to be carried out simultaneously by the processors, in which method:
  over a determined main time period, the main processor executes a first sequenced task while the auxiliary processor executes instructions of the first sequenced task over a plurality of auxiliary time periods;
  over the consecutive main time period, the main processor executes a second sequenced task;
  the method comprising:
  a step of emission by the main processor of a coordination marker to the auxiliary processor at the start of each main time period;
  a step of emission by the auxiliary processor of a response word formed on the basis of the last coordination marker received to the main processor at the end of each auxiliary time period;

a step of validation by the main processor of the response word received with respect to the first coordination marker emitted, the validation step being carried out at the start of the consecutive time period before the emission of a new coordination marker; and a step of signaling by the main processor if the response word received is not valid so as to signal a defect of coordination of the auxiliary processor.

The method advantageously allows the main processor to monitor the auxiliary processor in a simple and reactive manner, the coordination markers being dispatched systematically and in a regular manner. This is particularly advantageous for two asynchronous processors belonging to different cards. As the monitoring is carried out only by the main processor, the detection of a malfunction is very reactive (for example less than 10 ms), the main processor being monitored by other means. The monitoring method is easy to implement, thereby facilitating its installation and its application to a plurality of different cards.

Preferably, the signaling step comprises a step of emitting an alarm.

Preferably, the auxiliary card and the main card are linked by at least one auxiliary communication link. During the monitoring, any defect of the communication link is manifested by a delay or a deformation of the coordination markers and results in an emission of an alarm. Stated otherwise, the monitoring method is reliable and covers any malfunction of the electronic device.

Preferably still, the nature of the coordination marker is defined as a function of the topology of the auxiliary communication link so as to allow a highlighting of a current defect of said auxiliary communication link, preferably, a sticking of two consecutive bits of said auxiliary communication link.

Thus, for a communication link taking the form of a communication bus comprising 8 wires, the coordination marker is a hexadecimal integer coded on 32 bits.

Preferably, the coordination markers are dispatched in an alternate manner so as to distinguish two main time periods. Preferably still, the dispatched coordination markers are two in number.

According to one aspect of the invention, the response word is the complement of the last coordination marker received. Such a response word is, on the one hand, simple for the auxiliary processor to form and, on the other hand, simple for the main processor to compare. This is particularly advantageous for the auxiliary processor which has an auxiliary time period of short duration in which to form the response word.

Preferably, the main processor keeps only the last response word received so as to accelerate the monitoring method.

According to a preferred aspect, the electronic device comprising two auxiliary electronic cards comprising at least one auxiliary processor synchronized to an auxiliary clock of auxiliary time period, the main processor monitors the coordination of the execution of sequenced tasks on each auxiliary processor. Thus, the number of auxiliary cards can be increased without affecting the reliability of the monitoring.

According to another preferred aspect, the main electronic card comprising at least two main processors synchronized to one and the same main clock of main time period, each main processor monitors the coordination of the execution of sequenced tasks on the auxiliary processor. Thus, each auxiliary processor is monitored in two independent ways, the main processors being able to monitor one another reciprocally.

The invention relates furthermore to a method for monitoring the coordinated execution of sequenced tasks by an electronic card comprising at least one first processor and one second processor synchronized to one and the same clock of determined time period, the execution of the sequenced tasks being distributed between the processors, in which method:

over a determined time period, the first processor executes a first sequenced task while the second processor executes a first accessory task;

over the consecutive time period, the second processor executes a second sequenced task subsequent to the first sequenced task;

the method comprising:

a step of recording in memory means by the first processor of a first identifier characterizing the time period in the course of which the first sequenced task has been executed, the recording step being carried out in the course of the determined time period after execution of the first sequenced task;

a step of recording in the memory means by the second processor of a second identifier characterizing the time period in the course of which the first accessory task has been executed, the recording step being carried out in the course of the determined time period after execution of the first accessory task;

a step of comparison by the first processor of the first identifier and of the second identifier recorded in the memory means, the comparison step being carried out in the course of the consecutive time period; and a step of signaling by the first processor in the case of failure of the comparison so as to signal a defect of coordination of the processors.

By virtue of the monitoring method according to an aspect of the invention, the first processor can guarantee that the second processor executes the sequenced task in a coordinated manner over the determined time period. Thus, the sequenced tasks can be executed one after another in an optimal manner without risk of error. In an advantageous manner, the monitoring method makes it possible to detect a large number of malfunctions related to the processors and/or to the memory means. Moreover, this detection is reactive since a malfunction is detected in the time period in which it arises, this being advantageous by comparison with the prior art. This reactivity makes it possible during the signaling to transfer the functional tasks to a backup electronic card which deputizes for the failed electronic card and thus guarantee the reliability of the execution of the functional tasks.

Preferably, the first processor executing a second accessory task over the consecutive time period, the comparison step is carried out in the course of the consecutive time period before the execution of the second accessory task. Thus, it is determined in a reactive manner at the start of the consecutive time period whether a defect of coordination has occurred, this being advantageous.

According to one aspect of the invention, the accessory tasks (that is to say tasks that are not necessarily sequenced) can be mute tasks and not comprise any instructions. Stated otherwise, such accessory tasks correspond to rest periods of the processor.

Preferably, the consecutive time period is the time period which directly follows the determined time period but it goes without saying that the consecutive time period could be several clock cycles distant temporally from the determined time period.

Preferably, the method comprises a step of comparison by the second processor of the first identifier and of the second identifier recorded in the memory means, the comparison step being carried out in the course of the consecutive time period before the execution of the second sequenced task and a step of signaling by the second processor if the identifiers are not equal so as to signal a defect of coordination of the processors.

Advantageously, the second processor can guarantee that the first processor executes the sequenced task at the right moment, in tune with the synchronization of the processors. Stated otherwise, the processors monitor one another in a reciprocal manner, thereby improving the reliability of the execution of the functional tasks.

Preferably, the recording steps are implemented directly after the execution of the first accessory task and of the first sequenced task. Thus, the processors execute the recording instructions directly after having executed the instructions of the functional tasks so that the memory means comprise the most recent information.

Preferably still, the steps of the monitoring method are implemented at each time period. Thus, the electronic card is monitored in real time in the course of time, for example, throughout the duration of flight of an aircraft comprising said electronic card.

Preferably, the identifiers are integer numbers so as to distinguish the consecutive time periods.

According to a preferred aspect of the invention, the memory means take the form of a RAM memory linked to the two processors. Such a RAM memory is simple to implement on an electronic card and makes it possible to serve as intermediary, given that the recording steps can occur at different instants.

Preferably, each processor is linked to the RAM memory by a communication link. During the monitoring, any defect of the communication link is manifested by a delay or a deformation of the identifiers and results in a signaling, for example, an emission of an alarm. Stated otherwise, the monitoring method is reliable and covers any malfunction of the electronic card.

According to embodiments of the invention, the memory means belong to at least one of the processors or are independent of the processors.

Preferably, the electronic card being a main electronic card of an electronic device comprising at least two main processors synchronized to a main clock of determined main time period, the electronic device furthermore comprising at least one auxiliary electronic card comprising at least one auxiliary processor synchronized to an auxiliary clock of determined auxiliary time period, the auxiliary clock being faster than the main clock, sequenced tasks having to be carried out simultaneously by one of the main processors and the auxiliary processor, in which method:

over a determined main time period, the first main processor executes a first sequenced task while the auxiliary processor executes instructions of the first sequenced task over a plurality of auxiliary time periods;

over the consecutive main time period, the first main processor executes a second sequenced task;

the method comprising:

a step of emission by the first main processor of a coordination marker to the auxiliary processor at the start of each main time period;

a step of emission by the auxiliary processor of a response word formed on the basis of the last coordination marker received to the first main processor at the end of each auxiliary time period;

a step of validation by the first main processor of the response word received with respect to the first coordination marker emitted, the validation step being carried out at the start of the consecutive main time period before the emission of a new coordination marker; and a step of signaling by the first main processor if the response word received is not valid so as to signal a defect of coordination of the auxiliary processor.

In an advantageous manner, each main processor monitors the auxiliary processor, thereby guaranteeing great reliability of the method. Furthermore, as the main processors monitor one another in a reciprocal manner, a complete and redundant monitoring method is afforded which allows reactive (for example less than 10 ms) and systematic detection of any malfunction. The monitoring method is easy to implement, thereby facilitating its installation and its application to a plurality of different cards.

Preferably, the electronic device comprising at least two auxiliary electronic cards, each main processor of the main electronic card monitors the coordination of the execution of the sequenced tasks by each of the auxiliary processors. Such a monitoring method is advantageously generalizable to several auxiliary cards while guaranteeing the same level of reliability and the same level of complexity.

The invention is particularly advantageous for the monitoring of an electronic device of the onboard computer type, aboard an aircraft.

BRIEF DESCRIPTION OF THE DRAWINGS

The invention will be better understood on reading the description which follows, given solely by way of example, and referring to the appended drawings in which.

It should be noted that the figures set forth the invention in detail so as to implement the invention, said figures being able of course to serve to better define the invention if appropriate.

DETAILED DESCRIPTION

An embodiment of the invention will be presented for an electronic device which takes the form of an onboard electronic computer aboard an aircraft. It goes without saying that the invention applies to any type of electronic device comprising a plurality of computation processors such as for example an electronic device for use in the railroad sector, mobile telephony, the space or automobile sector.

Figure 1:
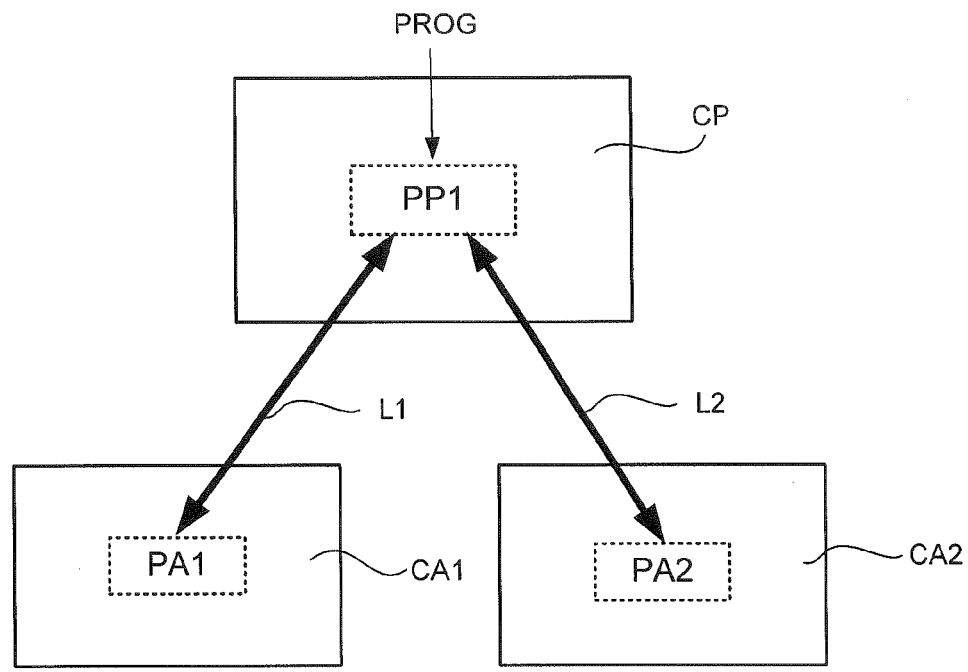
FIG. 1 is a schematic representation of a computer according to the prior art with a main card comprising only a single main processor.
Figure 2:
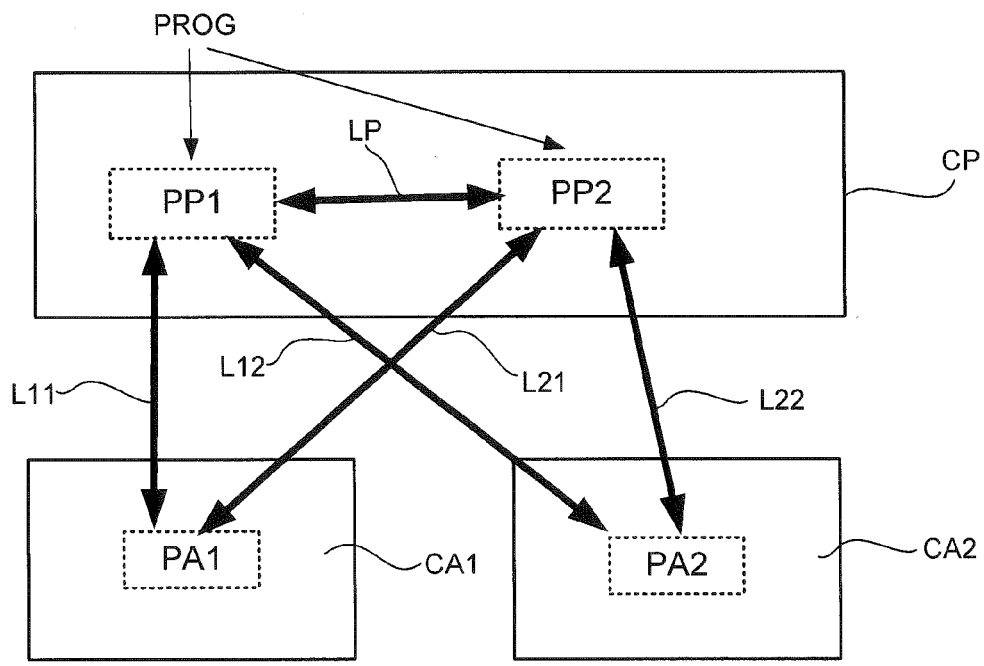
FIG. 2 is a schematic representation of a computer according to the prior art with a main card comprising two main processors.
Figure 3:
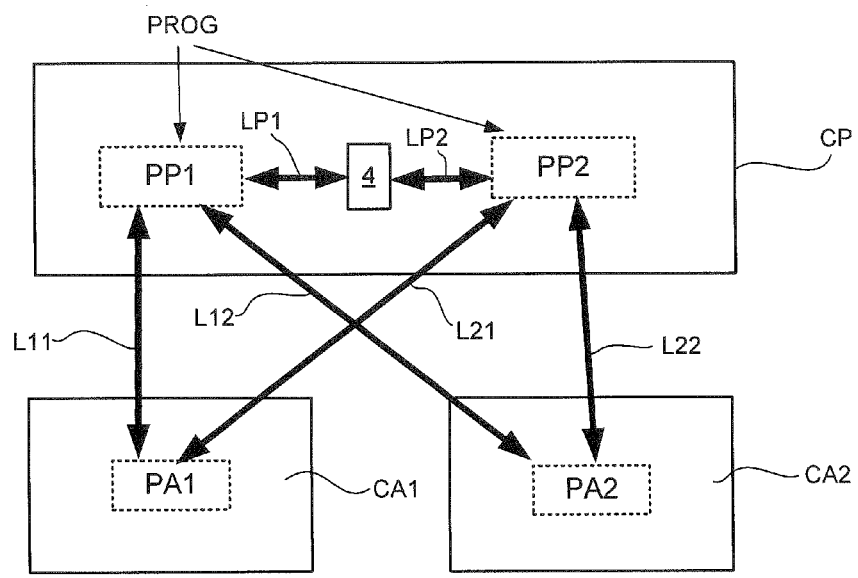
FIG. 3 is a schematic representation of a computer according to an embodiment of the invention with a main card comprising two main processors.

In this example, the computer comprises a main printed circuit card CP and two auxiliary printed circuit cards CA1, CA2 as illustrated in FIG. 3. To have significant computation power, the main card CP comprises two main processors PP1, PP2 so as to carry out functional tasks in parallel. As will be presented in detail subsequently, the main processors PP1, PP2 are linked by a communication link so as to allow the exchange of data between the processors PP1, PP2.

For its part, each auxiliary card CA1, CA2 comprises an auxiliary processor PA1, PA2 for processing functional tasks provided by the main processors PP1, PP2. For this purpose, each auxiliary processor PA1, PA2 is linked by an auxiliary communication link L11, L12, L21, L22 to each of the main processors PP1, PP2 as illustrated in FIG. 3. Preferably, the communication links L11, L12, L21, L22 take the form of communication buses comprising 8 wires for the communication of data coded on 32 bits.

In this exemplary embodiment, the auxiliary processors PA1, PA2 of the auxiliary cards CA1, CA2 are adapted for managing the input and output data of the flight computer. Hereinafter, the input/output data are designated I/O data. For example, the processor PA1, PA2 of the auxiliary card CA1, CA2 reads the data arising from the aircraft and issues orders to devices of the aircraft.

These functional tasks are defined in a software program PROG which is provided to the flight computer and interpreted by the main processors PP1, PP2 of the main card CP. To increase the computation power and to load the various main processors PP1, PP2 equitably, the functional tasks are distributed between the two main processors PP1, PP2 for their execution by the main electronic card CP. These functional tasks comprise a set of instructions a part of which can be entrusted to one or more auxiliary processors PA1, PA2 for their execution. The instructions arising from a functional task which are processed by an auxiliary processor PA1, PA2 are subsequently designated functional instructions.

The main processors PP1, PP2 are synchronized to one and the same main clock H of time period T so as to allow optimal chaining of the execution of the functional tasks. By way of example, the time period T of the main clock H is 5 ms.

Each auxiliary processor PA1, PA2 is synchronized to an auxiliary clock H1, H2 of time period t which is faster than the main clock H. By way of example, the time period t of each auxiliary clock H1, H2 is 500 µs. Stated otherwise, each auxiliary processor PA1, PA2 runs 10 times as quickly as a main processor PP1, PP2, the main processors PP1, PP2 and auxiliary processors PA1, PA2 being asynchronous.

According to an aspect of the invention, the monitoring of the coordination of the various processors PP1, PP2, PA1, PA2 is carried out by:
- a first monitoring method 10 (FIG. 4) dedicated to the monitoring of synchronous processors and
- a second monitoring method 20 (FIG. 7) dedicated to the monitoring of synchronous/asynchronous processors.

According to an aspect of the invention, the software program PROG comprises functional tasks S1-S4 which are sequenced, that is to say, that they must be executed according to an ascending order relation. Indeed, the functional task S3 can comprise parameters which must be computed in the course of the functional task S2.

As illustrated in FIG. 3, the main electronic card CP comprises memory means which take, preferably, the form of a RAM memory 4 linked to the two main processors PP1, PP2, but it goes without saying that the memory means can take diverse forms, for example, the form of a memory internal to a main processor PP1, PP2, shared between the two main processors PP1, PP2 or a memory external to the main electronic card CP. Furthermore, the memory means 4 can take the form of a unit memory block or the form of a plurality of memory modules that are connected or independent of one another.

Still with reference to FIG. 3, in this embodiment of the invention, the first main processor PP1 is linked to the RAM memory 4 by a first main link LP1 while the second main processor PP2 is linked to the RAM memory 4 by a second main link LP2. In this example the main links LP1, LP2 take the form of communication buses comprising 8 wires for the communication of data coded on 32 bits.

In the example which follows, the functional program comprises four sequenced functional tasks S1-S4 which must be executed by the first main processor PP1 with the exception of the functional task S2 which must be executed by the second main processor PP2. The functional tasks S1-S4 must be respectively executed over the time periods T1-T4.

Figures 5A, 5B:
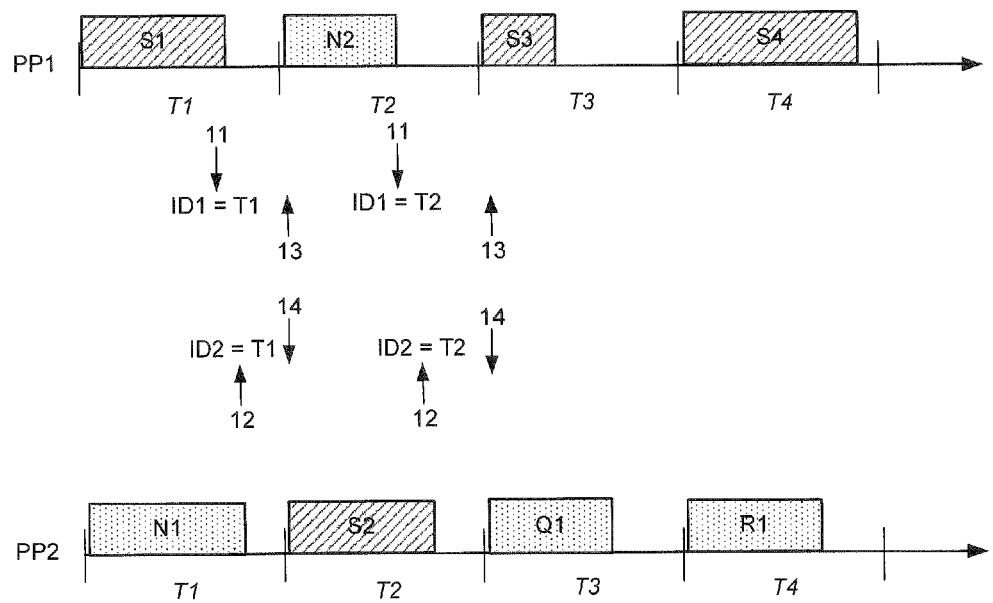
FIG. 5A is a first exemplary implementation of the coordination of the two synchronized main processors according to an aspect of the invention.
FIG. 5B represents the state of the RAM memory during the implementation of the first example of FIG. 5A.

When a main processor PP1, PP2 is not occupied by the execution of one of the sequenced functional tasks S1-S4, it executes accessory tasks (or background tasks) N1, N2, Q1, R1 as illustrated in FIG. 5A. These accessory tasks can consist, for example, in the execution of cyclic tasks or functional tasks which do not have any sequencing constraint.

The accessory tasks can be mute tasks and not comprise any instructions. According to the latter assumption, such accessory tasks correspond to rest periods of the processor.

First Monitoring Method 10

By virtue of the first monitoring method 10 according to an aspect of the invention, the coordination of the execution of the sequenced functional tasks S1-S4 by the main processors PP1, PP2 is ensured.

With reference to FIG. 5A, over the determined time period T1, the first main processor PP1 executes a first sequenced task S1 while the second processor PP2 executes a first accessory task N1. Over the consecutive time period T2, the first main processor PP1 executes a second accessory task N2 while the second main processor PP2 executes a second sequenced task S2 subsequent to the first sequenced task S1.

Figure 4:
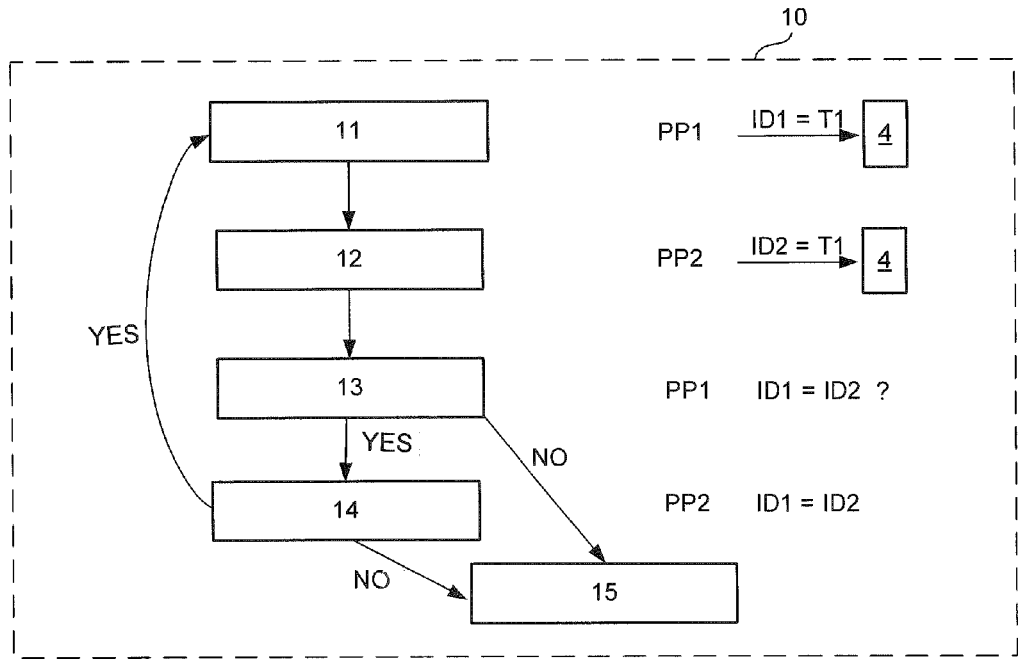
FIG. 4 is a schematic chart of a method for coordinating the two main processors of FIG. 3.

According to an aspect of the invention, with reference to FIG. 4, the method comprises a step of recording 11 in the RAM memory 4 by the first main processor PP1 of a first identifier ID1 characterizing the time period T1 in the course of which the first sequenced task S1 has been executed. In this example, the first identifier ID1 corresponds to the reference of the time period concerned (ID1=T1). It goes without saying that the identifier could correspond to any information relating to the time period concerned (name of time period, relative or absolute reference, etc.).

As illustrated in FIG. 5A, the recording step 11 is carried out in the course of the determined time period T1, after execution of the first sequenced task S1. In this example this recording step 11 takes the form of a step of writing by the first main processor PP1 to the RAM memory 4. In this example, with reference to FIG. 5B, the RAM memory 4 comprises a memory space dedicated to the first identifier ID1 to which the first main processor PP1 writes, via the first main communication link LP1.

In a similar manner, with reference to FIG. 4, the method comprises a step of recording 12 in the RAM memory 4 by the second main processor PP2 of a second identifier ID2 characterizing the time period T1 in the course of which the first accessory task N1 has been executed. As illustrated in FIG. 5A, the recording step 12 is carried out in the course of the determined time period T1 after execution of the first accessory task N1. In a similar manner, the second identifier ID2 corresponds to the reference of the time period concerned (ID2=T1).

In this example this recording step 12 takes the form of a step of writing by the second main processor PP2 to the RAM memory 4. In a similar manner, with reference to FIG. 5B, the RAM memory 4 comprises a memory space dedicated to the second identifier ID2 to which the second main processor PP2 writes, via the second main communication link LP2.

Preferably, the identifiers ID1, ID2 are integers coded on 32 bits and take values lying between 1 and 24, this being sufficient to ensure the differentiation of two consecutive time periods T1, T2. Nonetheless, it goes without saying that the identifiers ID1, ID2 could take different values.

The instants of execution of the recording steps 11, 12 depend on the duration of execution of the functional task over the time period concerned. Thus, with reference to FIG. 5A, the step of writing 12 over the time period T1 is earlier than the step of writing 11 over the time period T2.

Still with reference to FIG. 4, the method comprises a step of comparison 13 by the first main processor PP1 of the first identifier ID1 and of the second identifier ID2 recorded in the RAM memory 4. The comparison step 13 is carried out in the course of the consecutive time period T2 before the execution of the second accessory task N2 by the first main processor PP1 so as to avoid any time offset between the two main processors PP1, PP2.

Furthermore, the second accessory task N2 starts only when the comparison step 13 has terminated so as to take account of the communication lags between the first main processor PP1 and the RAM memory 4.

With reference to FIGS. 5A and 5B, during the comparison step 13, the memory spaces dedicated to the identifiers ID1, ID2 of the RAM memory 4 are read by the first main processor PP1 and then inter-compared. If the identifiers ID1, ID2 are not equal, the method comprises a signaling step 15, preferably, an emission of an alarm ALARM by the first main processor PP1 to signal a defect of coordination of the main processors PP1, PP2. Still with reference to FIGS. 5A and 5B, as the identifiers ID1, ID2 both equal T1, no alarm is emitted.

With reference to FIG. 4, the method comprises a step of comparison 14 by the second main processor PP2 of the first identifier ID1 and of the second identifier ID2 recorded in the memory means 4. In a similar manner, the comparison step 14 is carried out in the course of the consecutive time period T2 before the execution of the second sequenced task S2 by the second main processor PP2 and an alarm is emitted 15 by the second main processor PP2 to signal a defect of coordination of the main processors PP1, PP2 if the identifiers ID1, ID2 are not equal.

If no defect of coordination has occurred, new recording steps 11, 12 arise subsequent to the execution of the functional tasks N2, S2 by the main processors PP1, PP2 as illustrated in FIG. 5A. For a mute accessory task, that is to say, divested of instructions, the recording step is directly carried out subsequent to the comparison step.

The example of FIGS. 5A and 5B illustrates a coordinated execution of the sequenced functional tasks S1-S4, the comparison steps 13, 14 verifying that the main processors PP1, PP2 execute their tasks in the course of the same temporal instant T1-T4. For this purpose, no alarm is emitted.

Figures 6A, 6B:
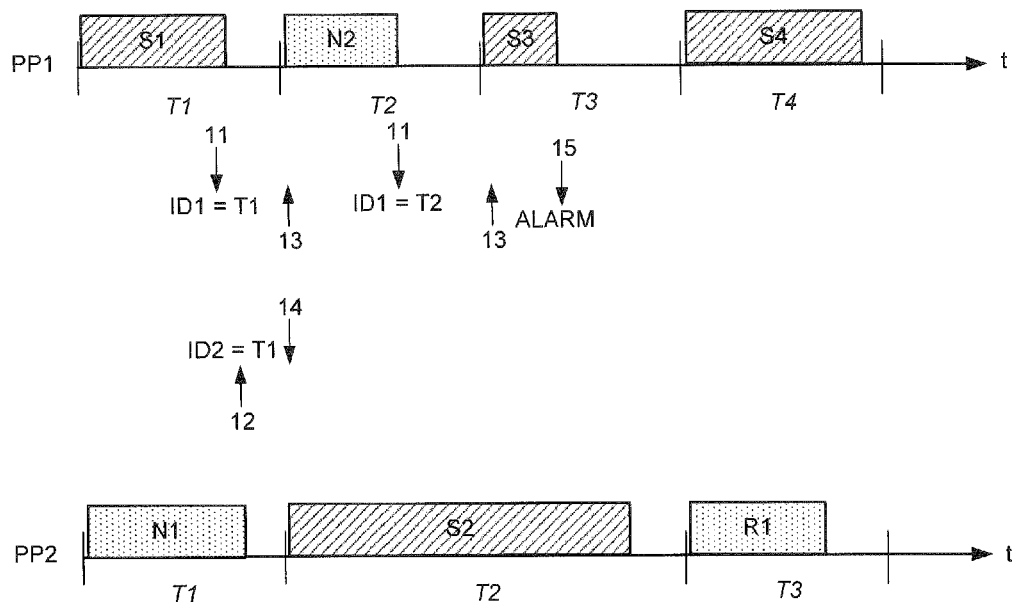
FIG. 6A is a second exemplary implementation of the coordination of the two synchronized main processors during a defect of coordination according to an aspect of the invention.
FIG. 6B represents the state of the RAM memory during the implementation of the second example of FIG. 6A.

The example of FIGS. 6A and 6B illustrates an execution of the sequenced functional tasks S1-S4 over the time periods T1-T4 in the course of which a malfunction arises. In this example, the second main processor PP2 executes the first accessory task N1 in the course of the first time period T1 and records its second indicator ID2=T1 in the RAM memory 4 (recording step 12). Thereafter, the second main processor PP2 executes the second sequenced task S2 in the course of the second time period T2. On account of a malfunction, the duration of the time period T2 is elongated as illustrated in FIG. 6A. It follows from this that the first main processor PP1 executes its second accessory task N2 in a faster manner than the second sequenced task S2.

At the end of the accessory task N2, the first main processor PP1 writes the first identifier ID1=T2 to the RAM memory 4 (recording step 11). At the start of the third time period T3, before the execution of the third sequenced task S3 by the first main processor PP1, the first main processor PP1 compares the first identifier ID1 and the second identifier ID2 recorded in the RAM memory 4 (comparison step 13). With reference to FIG. 6B, the first identifier ID1 of value T2 and the second identifier ID2 of value T1 are not equal. It follows from this that an alarm is emitted immediately by the main processor PP1 to signify a defect of coordination. Thus, the alarm is emitted right from the first time period T1, thereby guaranteeing reactive monitoring. In an advantageous manner, it is possible to toggle to a backup electronic device even before a defect of control is observed.

The alarm can take diverse forms, for example, a visual or sound signal, an emergency command, a control to toggle to another onboard device, etc.

Thus, in an advantageous manner, the first main processor PP1 and the second main processor PP2 monitor one another in a reciprocal manner to detect any temporal desynchronization of the processors PP1, PP2, any defect of coordination of the execution of the functional tasks, any defect of alertness of the main processors (shutdown of the processor, shutdown of the execution of the functional task). Furthermore, any defect of the main communication pathways LP1, LP2 between the main processors PP1, PP2 or of the RAM memory 4 is immediately detected, this also being advantageous.

Second Monitoring Method 20

As indicated previously, the software program PROG comprises functional tasks S1-S4 which are sequenced, that is to say, that they must be executed according to an ascending order relation.

When a functional task S1-S4 is carried out by one of the main processors PP1, PP2, the main processor concerned can subcontract instructions of the functional task concerned to an auxiliary processor PA1, PA2. To improve processing reactivity, the auxiliary processors PA1, PA2 and the main processors PP1, PP2 are asynchronous.

By virtue of the monitoring method, which will be presented subsequently, according to an aspect of the invention, the coordination of the execution of the sequenced functional tasks S1-S4 is ensured between a main processor PP1, PP2 and an auxiliary processor PA1, PA2.

Figure 7:
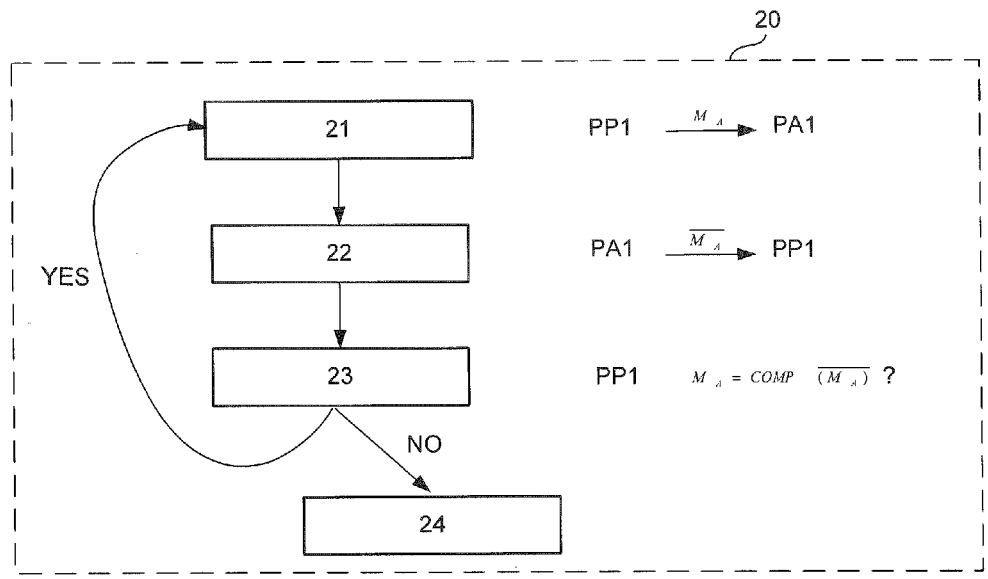
FIG. 7 is a schematic chart of a method for coordinating a main processor with an auxiliary processor.
Figure 8:
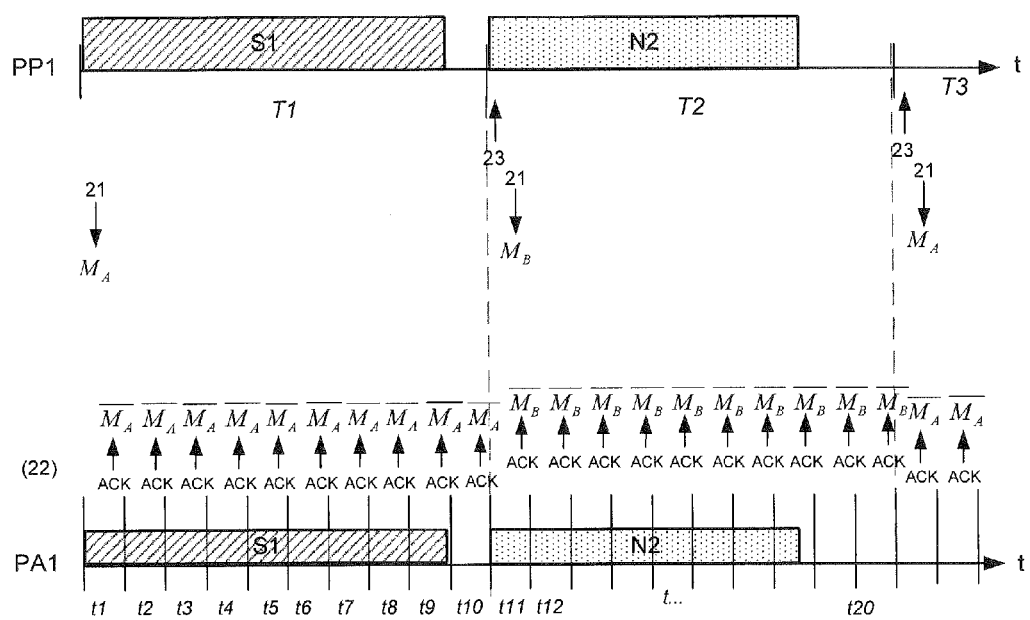
FIG. 8 is a first exemplary implementation of the coordination of a main processor with an auxiliary processor according to an aspect of the invention.
Figure 9:
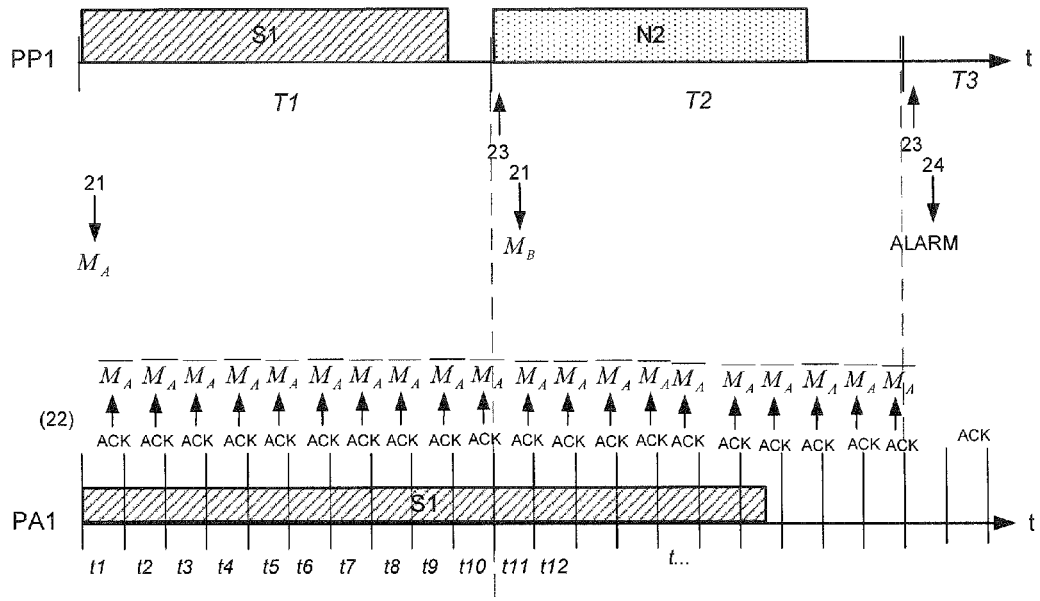
FIG. 9 is a second exemplary implementation of the coordination of a main processor with an auxiliary processor during a defect of coordination according to an aspect of the invention.
Figure 10:
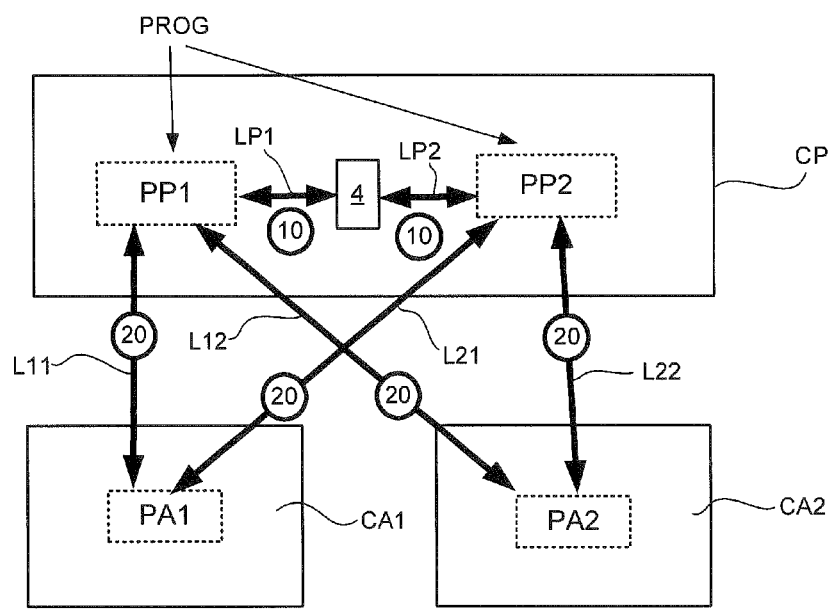
FIG. 10 is a schematic representation of a computer, according to an embodiment of the invention, on which the monitoring methods implemented are indicated.

By way of example, with reference to FIGS. 7 to 9, the monitoring of the coordination between the first main processor PP1 and the first auxiliary processor PA1 will be presented for the processing of the sequenced functional tasks S1, N2. Each functional task S1, N2 comprises respectively functional instructions s1, n2 which must be executed in a manner that is coordinated by the first auxiliary processor PA1.

As the main processors PP1, PP2 and the auxiliary processors PA1, PA2 are not synchronous, the first monitoring method 10 presented previously with reference to FIG. 4 cannot be implemented.

With reference to FIG. 8, over the determined time period T1 of duration 5 ms, the first main processor PP1 executes a first sequenced task S1 while the first auxiliary processor PA1 executes first functional instructions s1 over about ten auxiliary time periods t1-t10 of individual duration 500 µs.

Over the consecutive time period T2, the first main processor PP1 executes a second accessory task N2 while the first auxiliary processor PA1 executes second accessory instructions n2 over about ten temporal durations t11-t20.

According to an aspect of the invention, with reference to FIGS. 7 and 8, the method comprises a step of emission 21 by the first main processor PP1 of a coordination marker $M_A$, $M_B$ to the first auxiliary processor PA1 at the start of each main time period T1-T2. In this example, the first main processor PP1 emits a first coordination marker $M_A$ via the auxiliary communication line L11 to the first auxiliary processor PA1 at the start of the main time period T1.

Subsequent to the emission of the first coordination marker $M_A$, the method comprises a step of emission 22 by the first auxiliary processor PA1 of a response word ACK formed on the basis of the last coordination marker received $M_A$. The response word ACK is dispatched to the first main processor PP1 at the end of each auxiliary time period t1-t10. Thus, as illustrated in FIG. 8, in the course of the main time period T1, ten response words ACK are dispatched by the first auxiliary processor PA1.

Preferably, the response word ACK is the complement of the last coordination marker received $M_A$ received. Stated otherwise, the response word ACK is equal to $\overline{M_A}$ as illustrated in FIG. 8.

Preferably, the main processor PP1 keeps only the last response word ACK received. Stated otherwise, the last response word ACK received overwrites the response word received previously.

Subsequent to the emission of the response word ACK, the method comprises a step of validation 23 by the first main processor PP1 of the response word ACK received with respect to the first coordination marker $M_A$ emitted, the validation step 23 being carried out at the start of the consecutive time period T2 before the emission of a new coordination marker $M_B$. Thus, the first main processor PP1 checks the coherence of the response word received ACK so as to ensure that the communication link L11 and the first auxiliary processor PA1 have not failed and do not "deform" the coordination marker $M_A$ initially dispatched by the first main processor PP1.

Finally, the method comprises a signaling step 24, preferably, an emission of an alarm by the first main processor PP1 if the response word received ACK is not valid so as to signify a defect of coordination between the first main processor PP1 and the first auxiliary processor PA1.

In this example, with reference to FIG. 8, at the start of the consecutive time period T2, the first main processor PP1 verifies that the response word received ACK is indeed the complement of the first coordination marker $M_A$ initially dispatched. As this is the case in the example of FIG. 8, no alarm is emitted. Hence, a new coordination marker $M_B$ is dispatched by the first main processor PP1 at the start of the second time period T2 and a plurality of response words ACK ($\overline{M_B}$) are dispatched by the first auxiliary processor PA1. By ensuring that the coordination markers $M_A$, $M_B$ are properly received, the first main processor PP1 can verify the integrity of the first auxiliary processor PA1 as well as the integrity of the auxiliary communication link L11.

In this example, each auxiliary communication link L11, L12, L21, L22 takes the form of a BUS link with 8 wires for the communication of data coded on 32 bits.

Preferably, the coordination markers $M_A$, $M_B$ are two in number and are emitted in an alternate manner at the start of the main time periods T1, T2. The intrinsic nature of the coordination markers $M_A$, $M_B$ is defined so as to make it possible to detect a defect of transmission of bits of the coordination markers $M_A$, $M_B$. Furthermore, the two coordination markers $M_A$, $M_B$ are defined with respect to one another so as to favor identification of transmission defect. Preferably, the coordination markers $M_A$ and $M_B$ are defined so as to allow the detection of a determined defect, for example, the sticking of two consecutive bits.

Such coordination markers $M_A$, $M_B$ are related to the communication bus topology and make it possible to verify with relevance any defect of the stuck bits type for each auxiliary communication link L11, L12, L21, L22. Preferably, the method implements more than two different coordination markers so as to allow precise and fast verification of the set of wires of the auxiliary communication links L11, L12, L21, L22.

In an advantageous manner, the second monitoring method 20 is flexible to implement since it does not seek to measure that the set of response words ACK has indeed been received by the first main processor PP1 but solely that the tasks which are executed are properly coordinated. For this purpose, it is necessary for the auxiliary time period t1-t20 to be shorter than a main time period T1.

With reference now to the example of FIG. 9, the first auxiliary processor PA1 experiences a malfunction which prevents it from receiving the second coordination marker $M_B$ at the start of the second main time period T2. It follows from this that the first auxiliary processor PA1 continues to emit the complement of the first coordination marker $\overline{M_A}$ as response word ACK instead of emitting the complement of the first coordination marker $\overline{M_B}$.

Thus, during the comparison step 23 at the start of the third main time period T3, the first main processor PP1 compares the last coordination marker dispatched $M_B$ and the last response word $\overline{M_A}$ received. As the response word $\overline{M_A}$ is not the complement of the last coordination marker dispatched $M_B$, the method emits an alarm to signify a defect of coordination.

Thus, the alarm is emitted right from the start of the third time period T3, thereby guaranteeing reactive monitoring. In an advantageous manner, it is possible to toggle to a backup electronic device even before a defect of control is observed.

Thus, in an advantageous manner, the first main processor PP1 monitors the first auxiliary processor PA1 as well as the communication link L11 linking the first main processor PP1 to the first auxiliary processor PA1 so as to detect any defect of temporal coordination of the processors PP1, PA1, any defect of coordination of the execution of the functional tasks, any defect of alertness of the processors (shutdown of the processor, shutdown of the execution of the functional task). Thus, the processor having the longest time period can monitor the processor having the shortest time period.

Preferably, the second monitoring method 20 comprises a preliminary initialization phase in the course of which the main processor PP1 emits an initialization marker and receives the complemented marker in response.

Global Monitoring of the Device

In an advantageous manner, the device considered as a whole with its main electronic card CP and its auxiliary cards CA1, CA2 is monitored in a precise and reactive manner by the monitoring methods detailed previously.

Thus, by virtue of the second monitoring method 20, each auxiliary processor PA1, PA2 is monitored by each of the main processors PP1, PP2, thereby improving the reliability of the monitoring for the coordination of the execution of functional tasks on asynchronous or synchronized processors. The second monitoring method 20 furthermore guarantees the integrity of the auxiliary communication links L11, L12, L21, L22 between each main processor PP1, PP2 and each auxiliary processor PA1, PA2.

The second monitoring method allows the processor having the longest time period (main processor) to monitor the processor having the shortest time period (auxiliary processor). This does not present any drawbacks in the present invention having regard to the fact that the main processors PP1, PP2 mutually monitor one another. Hence, each of the processors is at least monitored by another processor, thereby guaranteeing reliability of the monitoring of the computer.

Incidentally, the second monitoring method 20 is also applicable for coordinating two synchronized processors. According to this assumption, just one response word is transmitted per clock cycle.

The first monitoring method 10 makes it possible to ensure reciprocal monitoring of the coordination of the main processors PP1, PP2 which are synchronized, as well as the integrity of the main communication links LP1, LP2.

Thus, the set of processors can be fully monitored for a card comprising at least three diverse processors or at least two synchronized processors, thereby conferring significant reliability on the electronic card.

The first monitoring method 10 is particularly adapted for monitoring a serial pathway comprising two communication wires which extends between two processors so as to detect a cutoff or stuck bits. The second monitoring method 20 is particularly adapted for monitoring the integrity of a parallel communication pathway comprising more than two communication wires.

To monitor the integrity of the computations of the processors, the two monitoring methods 10, 20 carry out in an advantageous manner a comparison step which is direct for the first monitoring method 10 or indirect for the second monitoring method 20 because of the computation of the response word (complement).

On account of the implementation of monitoring methods 10, 20, on the one hand, for synchronized processors and, on the other hand, for asynchronous processors, the computer is monitored in an optimal manner.

It goes without saying that the invention relates to a main card CP which comprises more than two main processors as well as auxiliary cards which comprise more than one auxiliary processor. Indeed, the two methods make it possible to solve on the one hand the coordination between synchronized processors, and also the coordination between unsynchronized processors. The coordination methods are therefore generalizable to a card comprising any number of main processors and any number of auxiliary processors.

The invention claimed is:

1. A method for monitoring the coordinated execution of sequenced tasks by an electronic device comprising a main electronic card comprising at least one main processor synchronized to a main clock of main time period and at least one auxiliary electronic card comprising at least one auxiliary processor synchronized to an auxiliary clock of auxiliary time period, the auxiliary clock being faster than the main clock, the sequenced tasks having to be carried out simultaneously by the processors, the method comprising:
   executing, by the at least one main processor and over a determined main time period, a first sequenced task while the at least one auxiliary processor executes instructions of the first sequenced task over a plurality of auxiliary time periods;
   executing, by the at least one main processor and over the consecutive main time period, a second sequenced task;
   emitting, by the at least one main processor, a coordination marker to the at least one auxiliary processor at the start of each main time period;
   emitting, by the at least one auxiliary processor, a response word formed on the basis of the last coordination marker received to the main processor at the end of each auxiliary time period;
   validating, by the at least one main processor, the response word received with respect to the first coordination marker emitted, wherein the validating is carried out at the start of the consecutive time period before the emission of a new coordination marker; and
   signaling, by the at least one main processor, if the response word received is not valid so as to signal a defect of coordination of the at least one auxiliary processor,
      wherein the at least one auxiliary electronic card and the main electronic card are linked by at least one auxiliary communication link,
      wherein the nature of the coordination marker is defined as a function of the topology of the at least one auxiliary communication link to allow a highlighting of a current defect of the at least one auxiliary communication link, and
      wherein the nature of the coordination marker is further defined as a function of the topology of the at least one auxiliary communication link to allow a highlighting of a sticking of first and second consecutive bits of the at least one auxiliary communication link.

2. The monitoring method as claimed in claim 1, wherein the coordination marker is a hexadecimal integer coded on 32 bits.

3. The monitoring method as claimed in claim 1, wherein the coordination markers are dispatched in an alternating manner.

4. The monitoring method as claimed in claim 3, wherein the coordination markers dispatched are two in number.

5. The monitoring method as claimed in claim 1, wherein the response word is the complement of the last coordination marker received.

6. The monitoring method as claimed in claim 1, wherein the main processor keeps only the last response word received.

7. The monitoring method as claimed in claim 1, wherein the electronic device comprises a second auxiliary electronic card comprising a second auxiliary processor synchronized to the auxiliary clock of auxiliary time period, and wherein the at least one main processor monitors the coordination of the execution of sequenced tasks on each of the at least one and the second auxiliary processor.

8. The monitoring method as claimed in claim 1, wherein the main electronic card comprises a second main processor synchronized to one and the same main clock of main time period as the at least one main processor, and wherein each of the at least one and the second main processor monitors the coordination of the execution of sequenced tasks on the at least one auxiliary processor.

* * * * *